United States Patent [19]

Maruyama et al.

[11] Patent Number: 4,705,228
[45] Date of Patent: Nov. 10, 1987

[54] SPINNING REEL HAVING IMPROVED BAIL ARM MECHANISM

[75] Inventors: Kenji Maruyama; Takehiro Kobayashi, both of Hiroshima, Japan

[73] Assignee: Ryobi Ltd., Hiroshima, Japan

[21] Appl. No.: 791,810

[22] Filed: Oct. 28, 1985

[30] Foreign Application Priority Data

Oct. 26, 1984 [JP] Japan .......................... 59-162696[U]
Oct. 31, 1984 [JP] Japan .......................... 59-166137[U]
Oct. 31, 1984 [JP] Japan .......................... 59-166138[U]

[51] Int. Cl.$^4$ ............................................. A01K 89/01
[52] U.S. Cl. ........................ 242/84.2 G; 242/84.21 A
[58] Field of Search .................... 242/84.2 A, 84.2 F, 242/84.2 G, 84.21 R, 84.21 A

[56] References Cited

U.S. PATENT DOCUMENTS

| | | | |
|---|---|---|---|
| 2,966,314 | 12/1960 | Mombur | 242/84.21 R |
| 3,342,442 | 9/1967 | Brantingson | 242/84.2 G |
| 4,389,027 | 6/1983 | Sazaki et al. | 242/84.2 G |
| 4,535,952 | 8/1985 | Carlsson | 242/84.2 G |

Primary Examiner—Billy S. Taylor
Attorney, Agent, or Firm—Sughrue, Mion, Zinn, Macpeak and Seas

[57] ABSTRACT

A spinning-type fishing reel having an improved bail changeover mechanism providing a light weight and simple reel construction while achieving high reliability and eliminating sources of line tangle. A bail arm is pivoted on a pair of opposed arms provided on a rotor in such a manner that the bail arm automatically returns from a line-releasing position to a line-rewinding position upon rotation of the rotor. A gear transmitting mechanism is linked with a bail-arm lever via a link mechanism having a plurality of links arranged so as to provide a dead point. A follower gear, rotatably linked with the link mechanism, is provided with a pin urged in the return direction of the bail arm by a spring. All members of the bail changeover mechanism are attached to the rotor and arranged such that a bail arm changeover cam and the pin block each other's movement in the line-releasing position of the bail arm.

6 Claims, 20 Drawing Figures

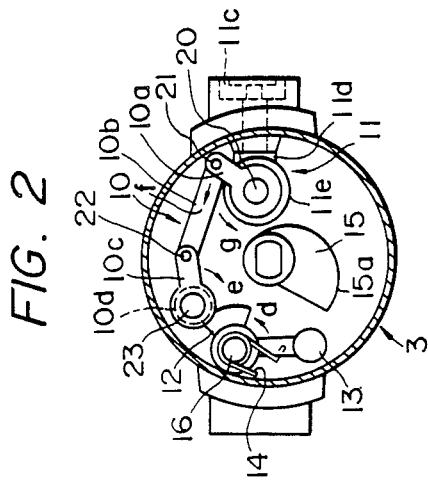
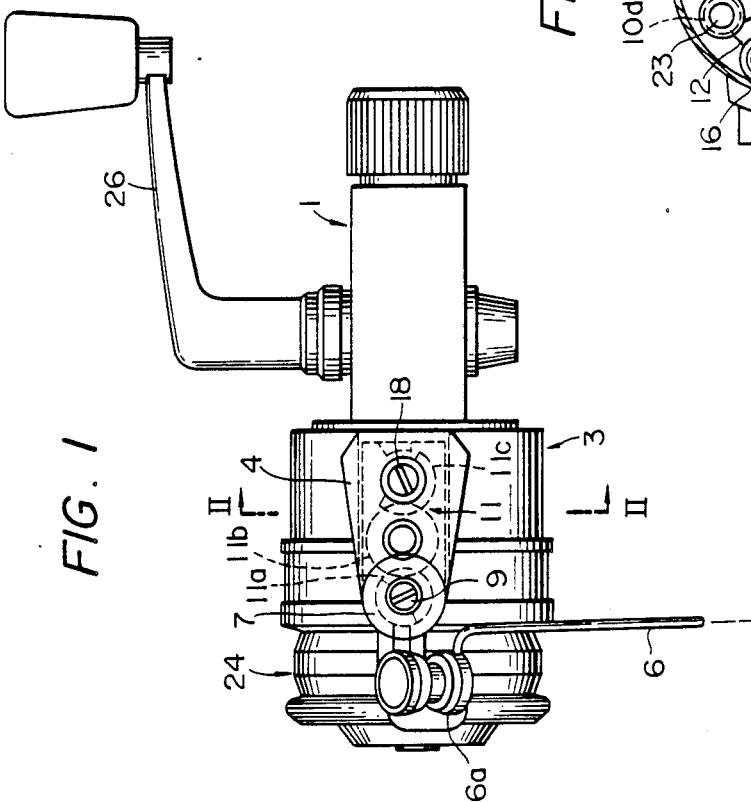

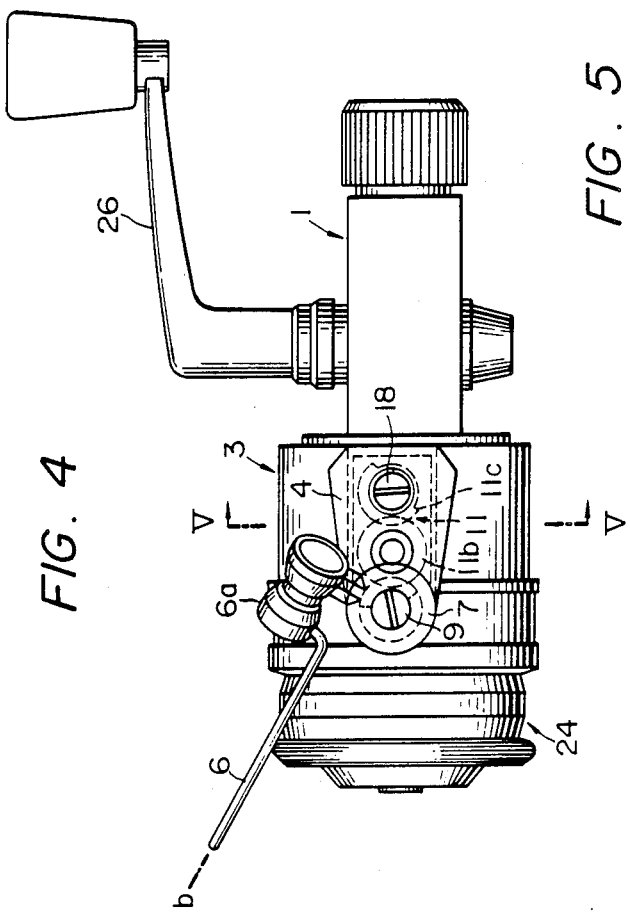
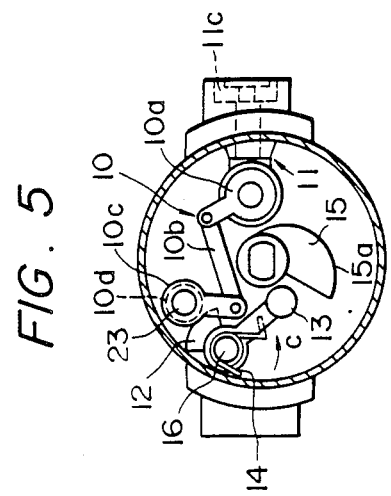
FIG. 4
FIG. 5

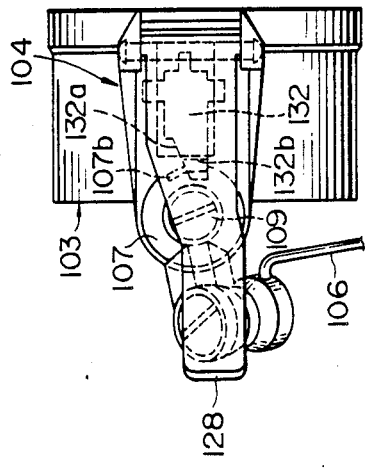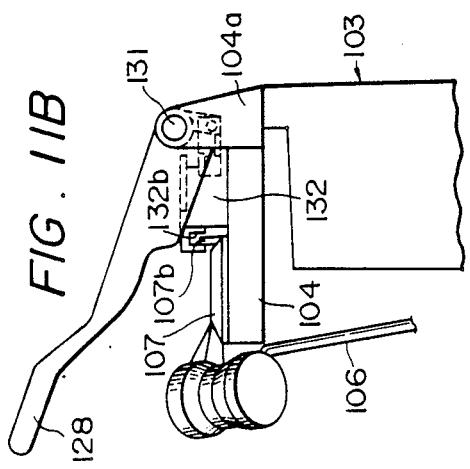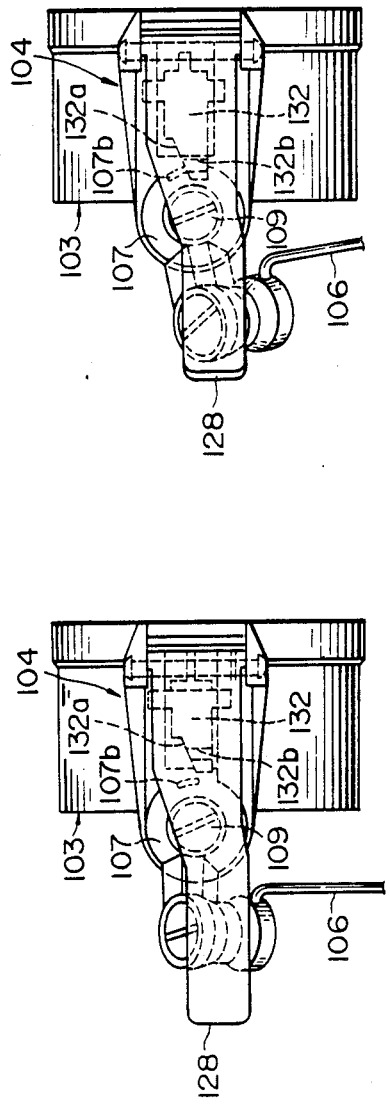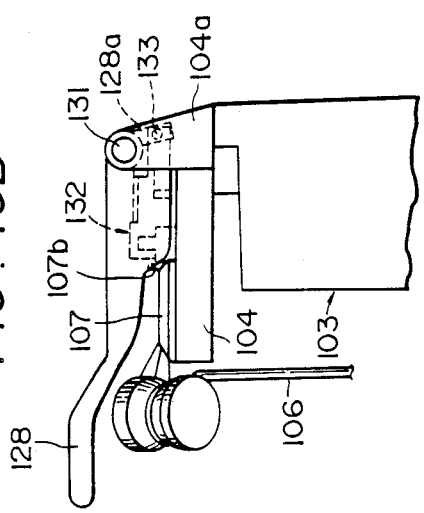

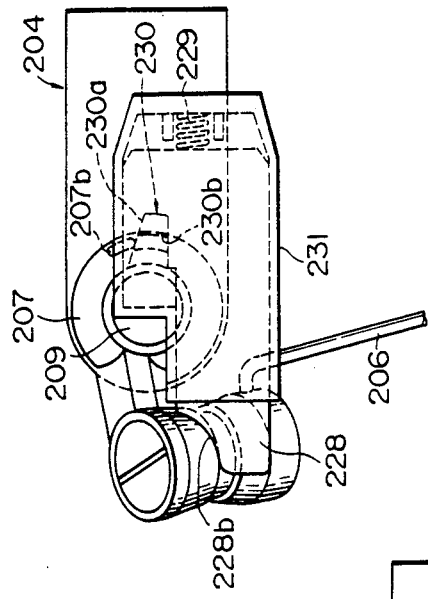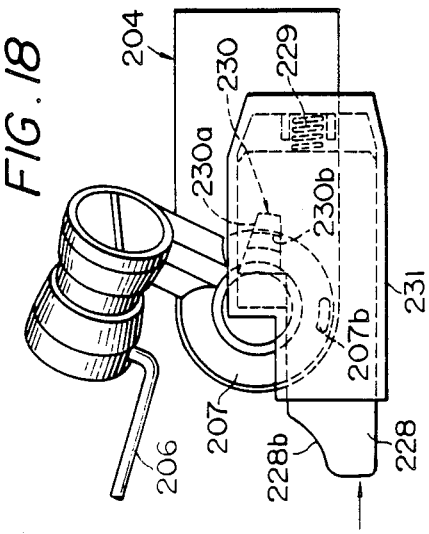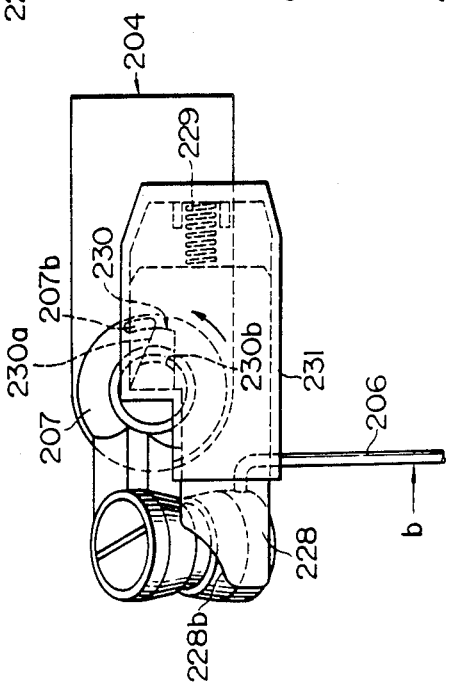

1

SPINNING REEL HAVING IMPROVED BAIL ARM MECHANISM

BACKGROUND OF THE INVENTION

The present invention relates to a bail arm changeover mechanism for an external spool type fishing spinning reel.

Conventionally, in a bail arm changeover device, when pushed to unlocked it when in its line-rewinding position, the bail arm is moved to its line-releasing position by means of a spring force and held in that position, whereas when the line is rewound, the bail arm is automatically moved from the line-releasing position to the line-rewinding position by the force of forward rotation (the line-rewinding force) of a rotor. Thus, the line can be cast without requiring a manual operation of moving the bail arm from the line-rewinding position to the line-releasing position. Such a bail arm changeover mechanism is known, for example, from U.S. Pat. No. 2,966,314.

Such a mechanism is provided with operating components including an actuator arm, a fitting, a connector shaft, etc., outside the rotor, in addition to the bail arm lever. Accordingly, with the provision of such a mechanism, problems such as the line easily tangling occur. Moreover, the external appearance of the reel is cluttered.

Further, a conventional bail arm changeover mechanism in which an operating lever is rotatably supported on a pair of opposed arms provided outside a rotor so that the bail arm is moved from its line-rewinding position to its line-releasing position by the rotational operation of the operating lever is known, for example, from Japanese Laid-Open Utility Model Application No. 17171/1984.

However, in that conventional mechanism, either in a mechanism of the type in which the operating lever is rotated by being pulled upwardly or in a device of the type in which the operating lever is rotated together with the bail arm lever, since the bail arm lever is directly rotated in the direction to establish an open state of the bail arm by the operating lever (that is, in the direction toward the line-releasing position of the bail arm) and therefore has to be turned to a position passing over a dead point of a torsion spring which elastically urges the bail arm toward both the line-rewinding and line-releasing positions, there are problems in that not only is the amount of displacement of the operating lever excessive, but also a large force is required to operate the operating lever, resulting in a poor operating performance.

SUMMARY OF THE INVENTION

In consideration of these problems of the prior art, an object of the present invention is to provide a bail arm changeover mechanism in which the bail arm can be moved to its line-releasing position only upon being pushed and returned to its line-rewinding position automatically by the rotation of a rotor, whereby a main mechanism can be built into the rotor and the linking of a bail arm lever is performed inside the rotor. With such an arrangement, tangling of the line is made avoidable and the external appearance of the reel can be improved, while maintaining the required functions as simply as those of the conventional reel.

According to the present invention, the foregoing problems have been solved by a bail arm changeover mechanism for a spinning-type fishing reel having a bail arm reversibly pivotally provided on a pair of opposed arms and provided on a rotor such that the bail arm automatically returns from its line-releasing position to its line-rewinding position upon rotation of the rotor, characterized in that the device comprises a gear transmitting mechanism linked with a bail-arm lever, a link mechanism linking a plurality of links thrugh a gear transmitting mechanism to form a dead point, and a follower gear rotatably linked with the link mechanism and provided with a pin urged in the return direction of the bail arm by a spring force. All of these members are mounted on the rotor and arranged such that a bail arm returning cam fixedly provided in a reel body and the pin interfere with each other (inhibit movement of the other) in the line-releasing position of the bail arm.

Another object of the present invention is to provide a spinning reel in which a cam is operated by rotationally pulling up a casting lever so as to indirectly slightly rotate a bail arm lever in the direction opposite the direction of opening the bail arm to thereby rotate the bail arm to a line-releasing position, wherein the amount of displacement of the casting lever is short and the casting lever can be operated with a small force to thereby improve its response.

According to the present invention, a spinning reel is provided in which one of a bail arm lever and a bail arm cam supporting a bail arm on a pair of opposed arms and provided on a rotor is supported on a shaft and elastically urged toward a line-releasing position by a torsion spring and in which the bail arm is turned from the line-releasing position to a line-rewinding position automatically by the forward rotation of a handle, characterized in that a cam having an inclined plane and a groove portion formed at the front end thereof is mounted on the arm so as to be slidable back-and-forth, the inclined plane being arranged to engage with a protrusion provided on the bail arm lever to enable the bail arm lever to be urged to rotate in the direction opposite the line-releasing position by the advancing displacement of the inclined plane, the groove portion being disposed at the rear side of the inclined plane and arranged to release the engagement between the inclined plane and the protrusion after the bail arm lever has been rotated by a predetermined angle so as to permit the arm lever to be rotated toward the line-releasing position, and in that a casting lever is pivotally supported at the rear side of the cam such that the casting lever can be rotatably pulled up against a spring force and the rotational pulling-up force of the casting lever can be converted into advancing displacement of the cam.

A still further object of the present invention is to provide a spinning-type fishing reel in which a cam is actuated by pushing a pushbutton to indirectly cause a bail arm lever to slightly rotate in the direction opposite to the open state to reach a line-releasing position, whereby a bail arm can be moved back to the line-releasing position only by slightly pushing the pushbutton with a small force, thereby improving the operating performance of the reel and reducing it in size as well as in weight.

According to this aspect of the present invention, the foregoing problems are solved by a spinning-type fishing reel in which one of a bail arm lever and a bail arm cam supporting a bail arm respectively on a pair of opposed arms and provided on a rotor is supported on a shaft and elastically urged toward a line-releasing position by a torsion spring and in which the bail arm is turned from the line-releasing position to a line-rewinding position automatically by the rotation of a handle, characterized in that a pushbutton is provided on the arm which can be pushed backwardly and is urged by a forward projecting force of a spring, a cam provided on the pushbutton is provided with an inclined surface and a groove, the inclined surface being engaged with a protrusion provided on the bail arm lever and being able by backward movement to push the bail arm lever to rotate in the direction opposite to the line-releasing position, the groove being disposed at a forward lower portion of the inclined surface and enabling the protrusion to pass in the rotational directional direction so as to release the engagement of the protrusion after the bail arm lever has been rotated by a predetermined angle; and in that a backward moving force caused upon pushing the pushbutton is converted into a force to rotate the bail arm lever in the direction opposite to the line-releasing position and transmitted to the arm lever.

BRIEF DESCRIPTION OF THE DRAWINGS

FIG. 1 is a side view showing a preferred embodiment of a bail arm changeover mechanism for a spinning type fishing reel according to the present invention when it is in a line-rewinding state;

FIG. 2 is a transverse sectional view taken on a line II—II in FIG. 1 when viewed in the direction of an arrow;

FIG. 4 is a side view of the same embodiment in the state of releasing the line;

FIG. 5 is a transverse sectional view taken on a line V—V in FIG. 4 when viewed in the direction of arrow;

FIGS. 10A and 10B and FIGS. 11A and 11B are plan views and side views showing the line-rewinding position of the bail arm and the operating condition of returning the bail arm to the line-releasing position in the same reel;

FIGS. 16 to 18 are plan views successively showing various operational conditions with respect to the relationship between the pushbutton and the bail arm lever in reel of FIG. 13.

DESCRIPTION OF THE PREFERRED EMBODIMENTS

Figure 3:
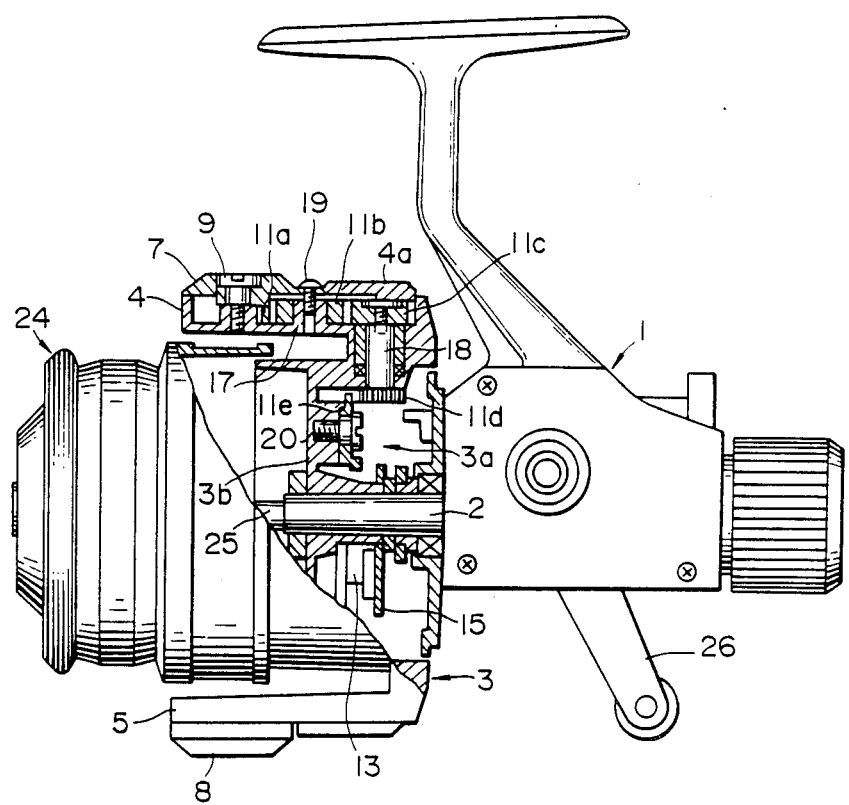
FIG. 3 is a partially cut-away side view of the same embodiment.

Referring to the drawings, preferred embodiments of the present invention will be described in detail hereunder.

In a first embodiment, as shown in FIGS. 1 to 5, a symmetrical pair of arms 4 and 5 project from a rotor 3, the latter being mounted on a reel body 1 through a shaft 2. A bail arm lever 7 and a bail arm cam 8, supporting a bail arm 6, are pivoted through stepped screws 9 at the respective forward ends of the pair of arms 4 and 5 so as to be rotatable between a line-rewinding position a, as shown in FIG. 1, and a line-releasing position b, as shown in FIG. 4.

In the bail arm cam 8, there is provided a torsion spring (not shown) used to apply to the bail arm 6 a rotational force so that the bail arm 6 is moved from the line-rewinding position to the line-releasing position and held thereat.

In a recess 3a formed around the bearing portion of the rotor 3 opposite the reel body 1, a link mechanism 10 is provided which is operated with the bail arm lever 7 through a transmitting gear mechanism 11, and a follower gear 12 with a pin 13 is supported on a shaft to be rotationally operated with the link mechanism. A spring 14 provides a spring force acting in the direction of an arrow c shown in FIG. 5. The follower gear 12 is disposed such that the pin 13 interferes with (blocks the motion of) a bail arm changeover cam 15, provided on the reel body 1 around the rotor bearing, when the bail arm lever 7 is at its line-releasing position b, the gear 12 being supported by the rotor 3 through a stepped screw 16 or the like.

As shown in FIG. 3, the gear transmitting mechanism 11 is constituted by a bail arm lever gear 11a formed around the shaft of the bail arm lever 7, an idler gear 11b engaging with the bail arm lever gear 11a, a drive gear 11c engaging with the idle gear 11b, a connecting gear 11d coaxial with the drive gear 11c, and a link gear 11e engaging with the connecting gear 11d.

The bail arm lever gear 11a, the idler gear 11b, and the drive gear 11c are rotatably supported by the stepped screw 9, a boss 17 of the arm 4, and a connecting shaft 18 passing through the base end of the arm 4. These members are covered with a cover 4a fixed to the arm 4 by a screw 19. The connecting gear 11d, fixed to an inner end of the connecting shaft 18, projects into the recess 3a of the rotor 3. The link gear 11e is supported on an annular wall 3b of the rotor 3 by a stepped screw 20 so as to be disposed within the recess 3a.

As shown in FIGS. 2 and 5, the link mechanism 10 has a dead point in an arrangement whereby a first link 10a having the link gear 11e is pivotally coupled to the rotor 2 by the stepped screw 20, a second link 10b has one end pivoted to the first link 10a by a pin 21, and a third link 10c is pivoted to the other end of the second link 10b by a pin 22. The third link 10c in integrally provided with a gear 10d pivotally attached to the rotor 3 by a stepped screw 23. The link mechanism 10 and the follower gear 12 are linked with each other when the follower gear 12 engages with the gear 10d of the third link 10c, and therefore the spring force of the spring 14, intervening in the follower gear 12, provides an elastic force acting on the link mechanism 10.

In FIGS. 1, 3 and 4, reference numeral 24 indicates a spool on which a fishing line is wound. The spool is fixed to a slide shaft 25 inserted into the shaft 2, and is slidably reciprocated in a back-and-forth movement by the rotational operation of a handle 26. At that time, the rotor 3 rotates to make it possible to uniformly wind the line (not shown) which is hung by the bail arm 6. Since this arrangement is the same as in a conventional spinning reel, this operation will not be described in further detail.

In the arrangement described above, the link mechanism 10 is in the state shown in FIG. 2, and therefore the bail arm 6 is not rotated by the elastic force of the spring 14 but held in its line-rewinding position of FIG. 1. While a line-rewinding force acts on the bail arm 6 through a line-hanger 6a thereof, the bail arm 6 is not moved but is kept in the position a, whereby a line-rewinding operation is performed.

In the state where the bail arm 6 is in the line-rewinding position a, if the bail arm 6 is slightly pressed rightwardly by the operator, the bail arm lever 7 and the bail arm cam 8 rotate counterclockwise, and this rotation is transmitted through the gear transmission mechanism 11 until the dead point of the link mechanism 10 is reached, namely, the position where the second and third links 10b and 10c are positioned linearly, whereupon the spring 14 of the follower gear 12 is extended.

If the bail arm 6 is released at this time, the elastic force of the spring 14 acts in the direction of the arrow d in FIG. 2 and the follower gear 12 rotates in the direction of the arrow d, and thus the third link 10c, the second link 10b, and the first link 10a rotate in the directions of respective arrows e, f, and g in FIG. 2, the dead point of the link mechanism 10 is passed, and the bail arm lever 7 and the bail arm cam 8 are rotated through the gear transmitting mechanism 11. Therefore, the bail arm 6 is turned from the rotation of FIG. 1 to the position of FIG. 4 by the action of the torsion spring energized by the bail arm cam 8, that is, the bail arm 6 is placed in the line-releasing position b of FIG. 4.

Without the operation of turning the bail arm 6 to the line-releasing position b, it is possible to turn the bail arm 6 to the line-releasing position b by only pushing it in the opposite direction to the line-releasing position to release it from the line-rewinding position a.

When the bail arm 6 reaches the line-releasing position b as described above, the pin 13 of the follower gear 12 changes from the position of FIG. 2 to the position of FIG. 5 so as to interfere in the bail arm changeover cam 15 since the follower gear 12 is rotated in the direction of the arrow d through the gear transmitting mechanism and the link mechanism 10.

Next, to return to the line-rewinding state, the rotor 3 is rotated in the forward direction (line-rewinding direction), that is, clockwise in FIG. 5, by the operation of the handle 26 so that the pin 13 is blocked from further rotation in the direction of arrow c by the stationary cam 15, and as rotor 3 continues in a clockwise direction, pin 13 is forced in the direction opposite to the arrow c, and the follower gear 12 is rotated in the direction opposite to the arrow d. By the rotational force of the follower gear 12, the link mechanism 10 is actuated, placing it in the state shown in FIG. 2, crossing its dead point. The actuation force is transmitted to the bail arm lever 7 through the gear transmitting mechanism 11 so that the bail arm 6 is rotated counterclockside in FIG. 4 against the elastic force of the torsion spring to return to the line-rewinding position in FIGS. 1 and 2.

The bail arm changeover mechanism for a spinning type fishing reel according to the present invention is arranged in the manner as described above. That is, a bail arm changeover mechanism is provided wherein the bail arm 6 is turned from the line-rewinding position a to the line-releasing position b merely by pushing it in the direction opposite the line-releasing position, and the bail arm 6 is automatically returned from the line-releasing position b to the line-rewinding position a by the rotation of the handle 26. With this arrangement all the primary components of the device, that is, the gear transmitting mechanism 11, the link mechanism 10, the follower gear 12, and the bail arm changeover cam 15, are disposed within the arm 4 and the rotor 3. Accordingly, in the inventive spinning reel, it is possible to avoid line tangling to the utmost since there is little chance for the line to be caught and tangled. Further, since the constituent members do not project outside, not only is the external appearance simplified, but the possibility of damage to the reel is reduced since there is little chance of striking a critical component against an outside object.

Figure 6:
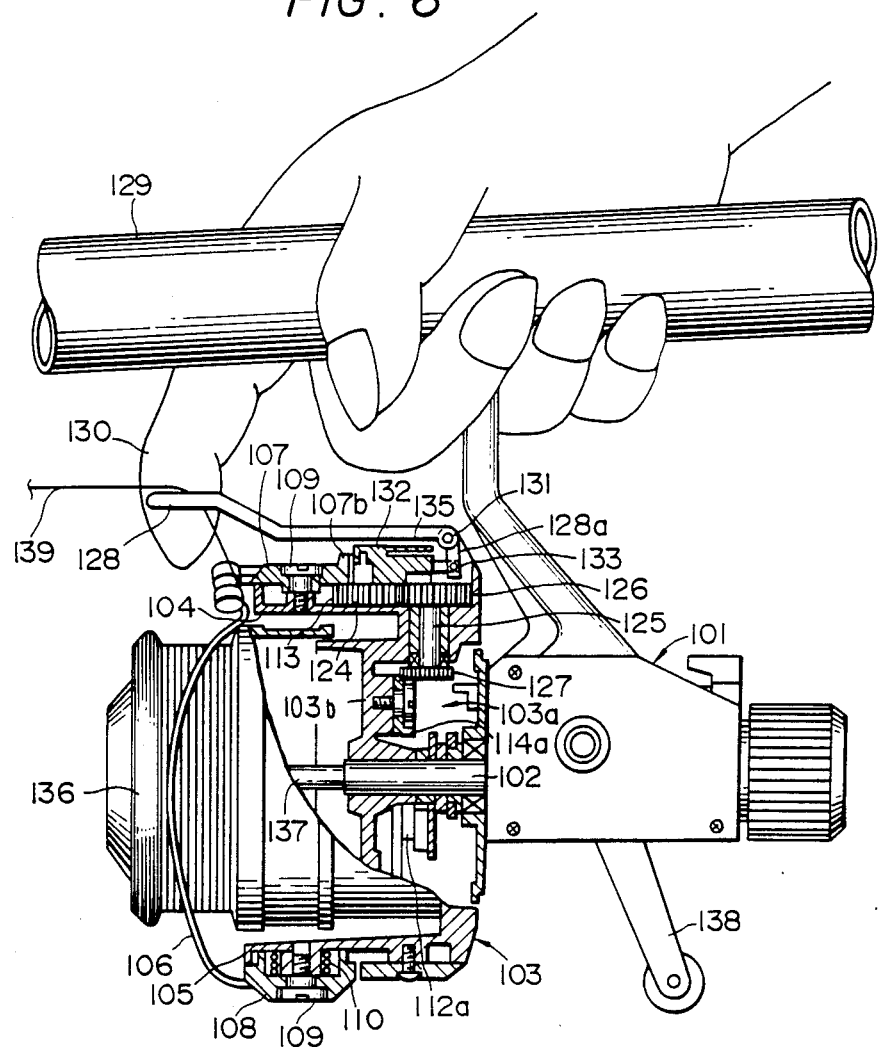
FIG. 6 is a side view, partly in section, of another embodiment of a spinning-type fishing reel according the present invention.
Figure 8:
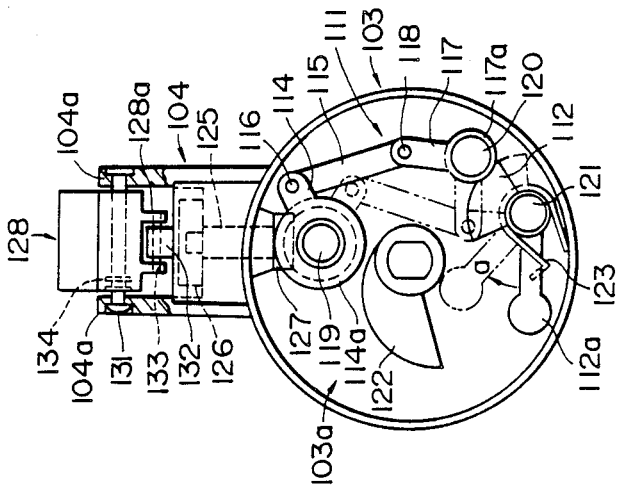
FIGS. 7 and 8 are a side view and a front view, respectively, partly in section, of the bail arm changeover mechanism of the same reel.
Figure 7:
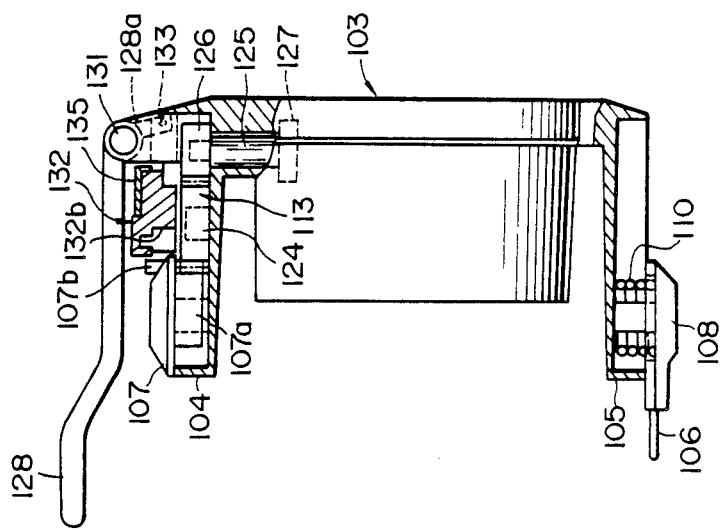

Another embodiment of the present invention will be described in detail hereunder with reference to FIGS. 6 through 12. As shown in FIG. 6 to 8, a pair of arms 104 and 105 are symmetrically provided, extending in the back-and-forth direction, on the outer circumference of a rotor 103 rotatably mounted on a reel body 101 through a shaft 102.

A bail arm lever 107 and a bail arm cam 108, supporting a bail arm 106, are pivoted through stepped screws 109 at the respective forward ends of the pair of arms 104 and 105 so as to be rotatable between a line-rewinding position and a line-releasing position. They are urged toward the line-releasing position by the spring force of a torsion spring 110 disposed within the arm 105.

In the inside of the rotor 103, a mechanism is provided to turn the bail arm 106 to the line-releasing position by unlocking the bail arm in the line-rewinding position and returning it from the line-releasing position to the line-rewinding position automatically upon rotation of the rotor. The foregoing mechanism is constituted by a link mechanism 111 having a dead point, a follower gear 112, and a gear transmission mechanism.

The link mechanism 111 is provided within a recess 103a formed in the rotor 103 and on a wall 103b formed in the rotor. As shown in FIG. 8, the link mechanism 111 is constituted by a first 114 and a second link 115 pivoted on each other through a pin 116 at each one end thereof, and a third link 117 with one end pivoted on the other end of the second link 115 through a pin 118. The first and third links 114 and 117 are provided with respective gears 114a and 117a which are rotatably pivoted to the wall 103b through respective stepped screws 119 and 120. The gear 114a of the first link 114 is linked with a gear 107a provided on the bail arm lever 107 through the gear transmission mechanism 113.

The follower gear 112 is rotatably pivoted on the wall 103b of the rotor 103 through a stepped screw 121 or the like and engaged with the gear 117a of the third link 117.

The follower gear 112 is provided with a radially projecting pin 112a which is elastically urged by a spring 123 extending in the direction of an arrow a in the drawing so as to interfere with a bail arm changeover cam 122 which is fixedly provided around the bearing portion of the rotor 103 at the body 101 side, whereby the link mechanism 111 is provided with a dead point.

The gear transmission mechanism 113, disposed within the arm 104, is constituted by an idler gear 124 engaged with the gear 107a of the bail arm lever 107 and supported by a shaft, a drive gear 126 engaged with the idler gear 124 and supported by a connecting shaft 125, and a connecting gear 127 fixed to an end of the connecting shaft 125 projecting into the recess 103a. The connecting gear 127 is engaged with the gear 114a of the first link 114 so that the bail arm lever 107 and the follower gear 112 are linked with each other.

The bail arm changeover mechanism is arranged as follows: Brackets 104a are provided on the base of the arm 104, and a casting lever 128 is supported by a lever shaft 131 so as to be rotationally pulled up by a finger 130 of an operator holding a fishing pole 129. A spring 134 is mounted around the lever shaft 131 so as to provide a recovery force. In the arm 104, a cam 132 is disposed between the base of the casting lever 128 and the bail arm lever 107 so as to be movable in the back-and-forth direction, and the rear end of the cam is pivotally supported by a shaft pin 133 on a protrusion 128a projecting from the base of the casting lever 128 so that the cam 132 can be moved forwardly upon pulling up the casting lever 128.

Figure 9:
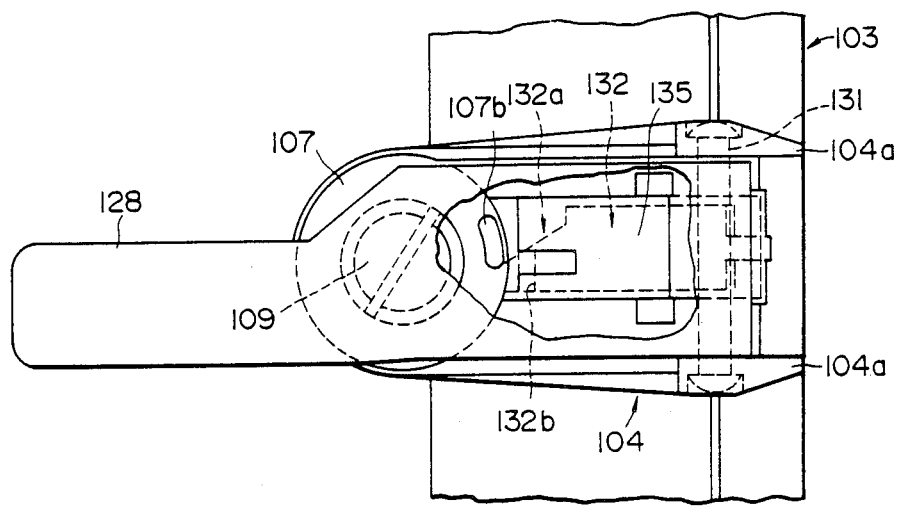
FIG. 9 is a partially cut-away plan view showing the relationship among the casting lever, the cam, and the bail arm lever in the same reel.

An inclined plane 132a is formed at one side of the forward end of the cam 132, as shown in FIG. 9, so as to be able to engage with a protrusion 107b projecting up from the bail arm lever 107, and a groove portion 132b is formed in the rear of the cam 132, open at end in the rear side of the inclined plane 132a. That is, the inclined plane 132a is provided in order to convert and transmit the advancing movement of the cam 132 caused by the engagement with the protrusion 107b into rotation of the bail arm lever 107 in the direction opposite to the line-releasing position. The groove portion 132b, formed in the rear face of the cam 132, extends laterally through the cam 132 such that the protrusion 107b is allowed to be inserted to release the inclined plane 132a from engagement with the protrusion 107b after the bail arm lever 107 has been rotated in a predetermined direction through a predetermined angle by the inclined plane 132a and such that the arm lever 107 is rotated in the direction from the line-rewinding position to the line-releasing position.

The cam 132 is covered with a cover plate 135 fixed to the arm 104 so as to not move or come off upwardly in FIG. 7.

In FIG. 6, reference numeral 136 designates a spool fixed on to a slide shaft 137. The spool is slidably reciprocated in the back-and-forth direction by the rotation of a handle 138. At that time, the rotor 103 rotates to make it possible to wind the fishing line 139 hung over the bail arm 106 uniformly onto the spool 136 while keeping it balanced, in the same way as the conventional spinning reel. Accordingly, a further description of the driving mechanism for the spool and the rotor 103 will be omitted.

In the reel described above, the bail arm is held in the line-rewinding position shown in FIG. 6 without being rotated by the elastic force of a spring 123 because the link mechanism is in the state shown by a solid line in FIG. 8. In that state, the casting lever 128 is held substantially horizontally, as shown in FIGS. 6, 7 10A and 10B, by a spring 134.

To turn bail arm from the line-rewinding position to the line-releasing position, the fishing line 139 is picked up by the finger 130 as shown in FIG. 6, and at the same time, the casting lever 128 is pulled up by the same finger 130 against the spring force, with the result that the cam 132 is urged to move forwardly in response to the casting lever so that the protrusion 107b of the bail arm lever 107 is engaged with the inclined plane 132a and urged to move from the line-rewinding position of FIG. 10A to the position of FIG. 11A to thereby cause the arm lever 107 to slightly rotate counterclockwise in a direction opposite to the line-releasing position as shown in FIG. 11A.

Thus, the rotation of the bail arm lever 107 is transmitted to the link mechanism 111 through the gear transmission mechanism 113 so as to cause the link mechanism 111 to pass its dead point, that is, a position where the second and third links 115 and 117 are aligned, so that the follower gear 112 is slightly rotated in the direction of the arrow a in FIG. 8 and the locked state in the line-rewinding position is released.

Figure 12:
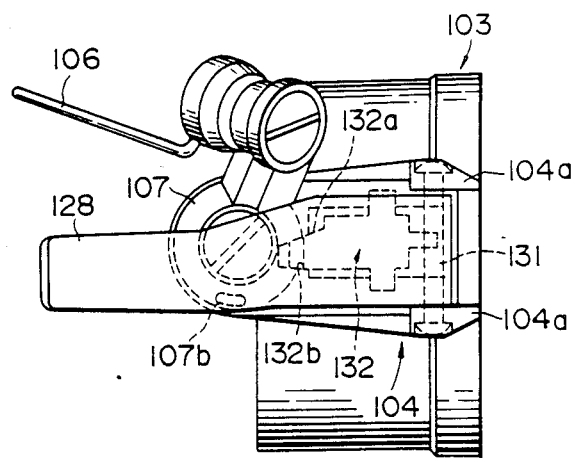
FIG. 12 is a partial plan view showing the line-releasing position of the bail arm in the same reel.

Next, the protrusion 107b is fitted into the groove portion 132b from the inclined plane 132a so as to be released from engagement with the latter, and the protrusion 107b passes the groove portion 132b so that the bail arm lever 107 is rotated to the line-releasing position of FIG. 12 by the torsion spring 110 and held thereat.

At that time, the link mechanism 111 is rotated in response to the bail arm lever 107, shown by the two-dot chain line in FIG. 8, so that the follower gear 112 is rotated clockwise by the spring force and the pin 112a thereof is positioned to interfere with the bail arm changeover cam 122.

Then, if the rotor 103 is rotated forward (in the line-rewinding direction) by the handle 126 in the line-releasing position, the pin 112a is restricted from rotating with the rotor 3 by the stationary cam 122, and as rotor 3 continues to rotate the pin 112a is forced in a direction opposite to the arrow a (FIG. 8) and against the force of the spring 123 force so that the bail arm lever 107 with the bail arm 106 is imparted a rotational force (counterclockwise in FIG. 12) through the link mechanism and the gear transmission mechanism and the bail arm 106 is returned to the line-rewinding position, shown in FIGS. 10A and 10B, against the spring force of the torsion spring 110.

In the thus-arranged spinning reel according to the present invention in which the bail arm 106 is rotated from the line-rewinding position to the line-releasing position by the pull-up operation of the casting lever 128 pivotally provided in the arm 104 of the rotor 103, the cam 132 is advanced by the pulling-up operation of the casting lever 128 so as to indirectly cause the bail arm lever 107 to slightly rotate in the direction opposite to the line-releasing position by the inclined plane 132a of the cam 132, and then the engagement between the protrusion 107b and the inclined plane 132a is released by the groove portion 132b of the cam 132 so that the bail arm lever 107 is moved back to the line-releasing position by the spring force of the torsion spring 110. Therefore, compared with the conventional spinning reel in which the bail arm is rotated to the line-releasing position directly by movement of the casting lever, the amount of displacement of the casting lever 128 due to the pulling-up operation can be reduced and also the force applied to the casting lever 128 can be reduced. Therefore, it is possible to make the casting lever 128 shorter.

Figure 13:
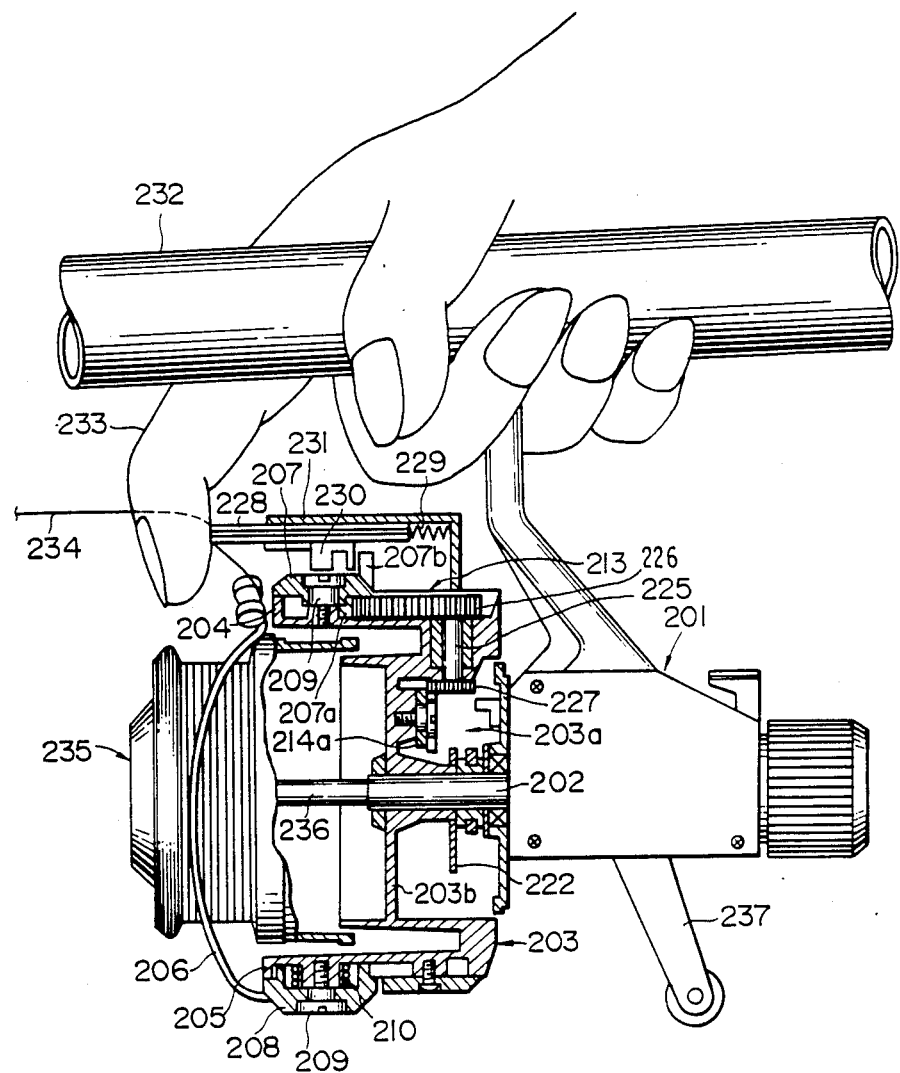
FIG. 13 is a side view, partially sectioned, of a spinning reel according to still another embodiment of the present invention.
Figure 14:
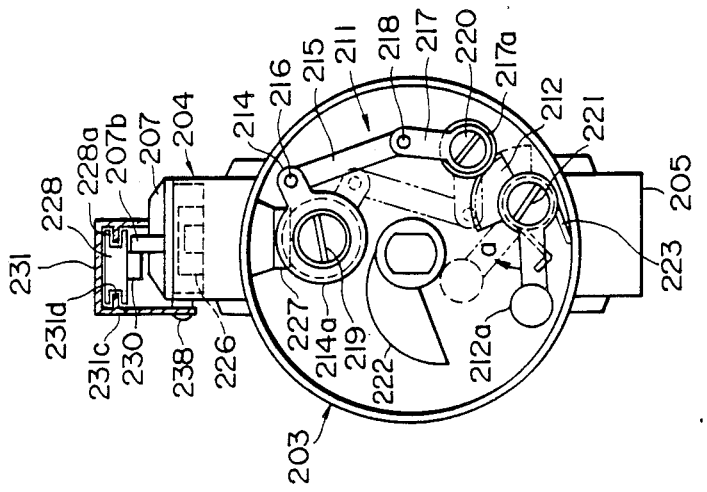
FIGS. 14 and 15 are a side view and a front view, respectively, partially sectioned, of important parts of the reel of FIG. 13.
Figure 15:
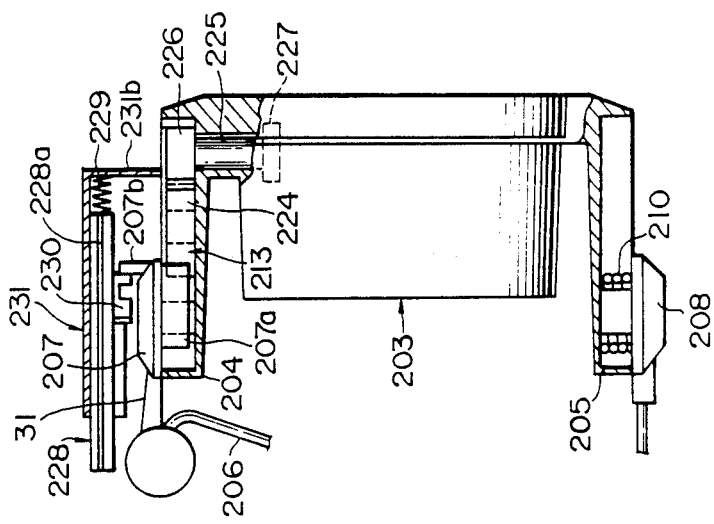

Referring to the drawings, a still further embodiment of the present invention will be described in detail hereunder. As shown in FIGS. 13 to 15, a pair of arms 204 and 205 are symmetrically provided, extending in the back-and-forth direction, on the outer circumference of a rotor 203 rotatably mounted on a reel body 201 through a shaft 202.

A bail arm lever 207 and a bail arm cam 208, supporting a bail arm 206, are pivoted through a stepped screw 209 at the respective forward ends of the pair of arms 204 and 205 so as to be rotated to a line-rewinding position and a line-releasing position. They are urged toward the line-releasing position by the spring force of a torsion spring 210 disposed within the arm 205.

In the inside of the rotor 203, a mechanism is provided to turn the bail arm 206 to the line-releasing position by unlocking the bail arm in the line-rewinding position and to returning it from the line-releasing position to the line-rewinding position automatically upon rotation of the rotor.

The foregoing mechanism is constituted by a link mechanism 211 having a dead point, a follower gear 212, and a gear transmission mechanism.

The link mechanism 211 is provided within a recess 203a formed in the rotor 203 and on a wall 203b around the bearing of the rotor. As shown in FIG. 15, the link mechanism 211 is constituted by a first link 214 and a second link 215 pivoted on each other through a pin 216 at each one end thereof, and a third link 217 with its one end pivoted on the other end of the second link 215 through a pin 218. The first and third links 214 and 217 are provided with respective gears 14a and 17a which are rotatably pivoted on the wall 203b through respective stepped screws 219 and 220. The gear 214a of the first link 214 is linked with a gear 207a provided on the bail arm lever 207 through the gear transmission mechanism 213.

The follower gear 212 is rotatably pivoted on the wall 203b of the rotor 203 through a stepped screw 221 or the like and engaged with the gear 217a of the third link 217. The follower gear 212 is provided with a radially projecting pin 212a which is elastically urged by a spring 223 extending disposed in the direction of an arrow a in the drawing so as to interfere with a bail arm changeover cam 202 which is fixedly provided around the bearing portion of the rotor 203 at the body 201 side, whereby the link mechanism 211 is provided with a dead point.

The gear transmission mechanism 213 is disposed within the arm 204, and constituted by an idler gear 224 engaged with the gear 207a of the bail arm lever 207 and supported by a shaft, and a drive gear 226 engaged with the idle gear 224 and supported by a connecting shaft 225, a connecting gear 227 fixed to an end of the connecting shaft 225 projecting into the recess 203a. The connecting gear 227 is engaged with the gear 214a of the first link 214 so that the bail arm lever 7 and the follower gear 12 are linked with each other.

The bail arm changeover mechanism is arranged as follows:

As shown in FIGS. 13 to 19, in the arm 204, a pushbutton 228 is disposed outside the bail arm lever 207 slidably in the back-and-forth direction, and a spring 229 is provided to urge the pushbutton 228 to project forwardly. Further, on the rear face of the pushbutton 228, a cam 230 is provided integrally therewith and disposed in opposition to the bail arm lever 207.

There are formed an inclined surface 230a at the rear side of the cam 230 and a lateral groove 230b at the forward rear side portion of the inclined surface 230a, the inclined surface 230a being engaged with the protrusion 207b projecting from the bail arm lever 207 for converting the backward movement of the pushbutton 228 when it is pushed into a rotational force for the bail arm lever 207 in the direction opposite to the line-releasing position and for transmitting the force to the bail arm lever 207, and the groove 230b being arranged to allow the protrusion 207b to pass so that the protrusion 207b is disengaged from the inclined surface 230a and rotated toward the line-releasing position when the protrusion 207b has been rotated by the inclined surface 230a by a predetermined rotational angle.

In the outside of the arm 204, a cover 231 which is U shaped in transverse cross-section and elongated in the forward-backward direction, is fixed by a screw 238 or the like longitudinally along the arm 204. The front and rear portions of the cover 231 are formed in an opening portion 231a and on the closed end wall 231b, respectively, so that the pushbutton 228 is fitted in the cover 231 slidably in the forward backward direction.

The spring 229 is interposed between the closed end wall 231b of the cover 231 and the rear end surface of the pushbutton 228 so as to elastically urge the pushbutton 228 to project out of the opening portion 231a of the cover 231.

In the right and left side walls of the pushbutton 228 and in the internal surfaces of right and left side walls 231c of the cover 231, a pair of grooves 228a and a pair of ridges 231d are provided, with the grooves and the ridges being elongated in the forward-backward direction in opposition to each other and slidably fittingly engaged with each other so that the pushbutton 228 is supported by the arm and is operated by pushing it.

The pushbutton 228 is beforehand disposed to a position wherein at least the forward end portion thereof can be easily pushed by a finger 223 of the operator holding a fishing pole 232, as shown in FIG. 13, and the forward end portion thereof is shaped such that a recess portion 228b is formed in one side portion thereof so that the forward end portion can be easily pushed by the tip of the finger picking up the fishing line 234, as also shown in FIG. 13.

In FIG. 13, reference numeral 235 designates a spool fixed on a piston shaft 236. The spool is caused to slide in the back-and-forth direction by the rotation of a handle 237. When rotated, the rotor 203 rotates to make it possible to wind the line 234 hung over the bail arm 206 while maintaining balance, in the same way as in the conventional device. Accordingly, a further description of the driving mechanism therefor will be omitted.

In the fishing reel constructed as described above, in the case of FIGS. 13 and 16 where the bail arm 206 is in the line-rewinding position, the pushbutton 228 is projected forwardly by a spring force, and the forward end of the inclined plane 230a of the cam 230 is positioned in the vicinity of one side portion of the protrusion 207b of the bail arm lever 207 and held without engaging with the latter.

To change from the line-rewinding portion to the line-releasing one, the pushbutton 228 is pushed against the spring force in the line-rewinding position of FIG. 16 so that the inclined plane 230a and the protrusion 207b of the bail arm lever 207 engage with each other, and is further pushed so that the protrusion 207b is rotated slightly in a counterclockwise direction as shown by the arrow in FIG. 16, in the direction opposite to the direction toward the line-releasing position. The link mechanism 211 is moved in response to the rotation of the protrusion 207b so as to pass its dead point, whereby the locked state in the line-rewinding position is released. When the bail arm lever 207 is rotated through a predetermined angle, the protrusion 207b and the groove portion 230b of the cam 230 are aligned so that the former engages with the latter, whereby the engagement between the inclined plane 230a and the protrusion 207b is released, whereupon the protrusion 207b now travels in a clockwise direction and passes across the groove portion 230b, with the result that the bail arm lever 207 is returned from the position of FIG. 17 to the line-releasing position shown in FIG. 18 by the torsion spring 210.

When the line 234 is picked up by the tip of a finger, the pushbutton 228 is pushed at the same time. When the pushbutton 228 is released from the pushing force after the protrusion 207b passes across the groove portion 230b, the pushbutton 228 is urged forwardly by the spring force to return to the position of FIG. 16 to be ready for the next changeover operation of the bail arm to the line-releasing position.

When the bail arm 206 is in the line-releasing position as described above, the follower gear 212 linked with the link mechanism 211 is rotated by spring force, as shown in the two-dot chain line of FIG. 15, and the pin 212a is kept in the position interfering with the cam 222.

Next, to return the bail arm 206 to the line-rewinding position, the handle 237 is rotated in the line-rewinding direction to rotate the rotor 203, the pin 212a abuts the stationary cam 222 and is restricted from rotating with the rotor 203, as the rotor 203 continues to rotate, the pin 212a is forced in a direction opposite to the arrow a (FIG. 15) and against the force of the spring 223. This rotation of the pin 212a is transmitted to the line mechanism 211 so as to rotate the latter to a position beyond the dead point. The rotation of the link mechanism is then transmitted to the gear transmission mechanism 213 so that the bail arm 206 is returned to the line-rewinding position of FIG. 16.

At that time, as the pushbutton 228 is held projecting forwardly, the cam 230 is never subject to interference by the protrusion 207b.

With the spinning reel according to the present invention arranged as described above, in releasing the line, the pushbutton 228 is pressed by the tip of the finger picking up the line 234, and the protrusion 207b is moved counterclockwise rotational direction by the inclined plane 230a of the cam 230, integrally formed with the pushbutton, so that the bail arm lever 207 is slightly rotated in the direction opposite to the line-releasing position to release the locked state. Immediately thereafter, the protrusion 207b passes across the groove portion 230b of the cam 230 in a clockwise rotational direction so that the bail arm lever 207 is returned to the line-releasing position by the torsion spring 210. Thus, not only is the amount of movement needed to return the bail arm made short since the arm lever is not returned to the line-releasing position directly by a lever differing from the conventional lever system, but also the pushbutton 228 can be operated by only a small force so that the bail arm return motion can be made rapidly and lightly because it is sufficient to rotate slightly the bail arm lever 207 via the cam 230.

Compared with the conventional lever system, the required operating space for the reel of the invention is less and the pushbutton 228 need not project far in front of the arm 204. Thus, it is possible to make the mount for receiving the fishing pole short. Moreover, since the structure can be simply formed with a small number of members, including the pushbutton 228 provided with the cam 230 and the spring 229, the reliability of the reel is improved and the manufacturing cost is made low.

We claim:

1. A bail arm changeover mechanism for a spinning type fishing reel comprising:

a bail arm (6); a pair of opposed arms (4, 5) pivotally supporting said bail arm; a rotor (3) securing the pair of opposed arms and bail arm such that the bail arm automatically returns from a line-releasing position to a line-rewinding position upon rotation of the rotor, a bail arm lever (7) mounted on one of said arms; a bail arm cam (8) mounted opposite the bail arm lever on another one of said arms; a gear transmitting mechanism (11) connected with the bail arm lever; a link mechanism (10) disposed completely within the rotor and connected with the gear transmitting mechanism, said link mechanism having a plurality of links (10b, 10c); a follower gear (12) supported by the rotor and connected with the link mechanism; a spring (14) biasing the follower gear towards a line-releasing position; a pin (13) provided on the following gear; a bail arm changeover cam (15) fixedly attached in a reel body (1) and forcing the pin and follower gear in a direction opposed by the spring when the rotor is rotated when the bail arm is in the line-releasing position, whereby the bail arm lever rotating opposite the line-releasing position moves the link mechanism into a dead point where the links (10b, 10c) are linearly aligned, and permits the spring to bias the follower gear into a line-releasing position.

2. A bail arm changeover mechanism as recited in claim 1, further comprising:

a cam (132) cooperating with the bail arm lever and slidingly disposed on said one arm for movement in a back-and-forth direction, the cam including a front end and a rear end; an inclined surface disposed on the front end of the cam; a groove portion disposed on the inclined surface; a casting lever pivotally supported at the rear end of the cam with means to transmit linear displacement of the cam into rotational movement of the lever; a projection on the bail arm lever cooperating with the cam such that upon forward displacement of the cam, the inclined surface contacts the projection and rotates the bail arm lever in a predetermined direction opposite the line releasing direction until the groove comes into alignment with the projection to enable the bail arm lever to rotate in the line-releasing direction.

3. A bail arm changeover mechanism for a spinning type fishing reel as recited in claim 1, further comprising:

a pushbutton (228) cooperating with the bail arm lever; a cam (230) secured to a rear face of the pushbutton and having a front end and a rear end; an inclined surface (230a) disposed on the front end of the cam; a grooved surface (230b) disposed on the inclined surface; a spring (229) urging the pushbutton in a forward direction; a protrusion (207b) on the bail arm lever disposed so that when the pushbutton is pushed backward against the bias of the spring, the inclined surface comes in contact with the protrusion and rotates the bail arm lever in a direction opposite the line-releasing direction until the groove in the cam becomes aligned with the protrusion at which time the bail arm lever rotates in a line-releasing direction.

4. A bail arm changeover mechanism as recited in claim 1, whereby the link mechanism (10) comprises:
a plurality of links pivotally connected to one another by securing means, said link mechanism positioned in the line-rewinding position until said bail arm lever is rotated opposite the line-releasing position which moves the link mechanism into a dead point where two of said links are linearly aligned and permits the spring to expand and rotate said follower gear and link mechanism into the line-releasing position.

5. A bail arm changeover mechanism as recited in claim 2, whereby the link mechanism comprises:
a plurality of links pivotally connected to one another by securing means, said link mechanism positioned in the line-rewinding position until said bail arm lever is rotated opposite the line-releasing position which moves the link mechanism into a dead point where two of said links are linearly aligned and permits the spring to expand and rotate said follower gear and link mechanism into the line-releasing position.

6. A bail arm changeover mechanism as recited in claim 3, whereby the link mechanism comprises:
a plurality of links pivotally connected to one another by securing means, said link mechanism positioned in the line-rewinding position until said bail arm lever is rotated opposite the line-releasing position which moves the link mechanism into a dead point where two of said links are linearly aligned and permits the spring to expand and rotate said follower gear and link mechanism into the line-releasing position.

* * * * *